US012749627B2

(12) United States Patent
Chikuma

(10) Patent No.: US 12,749,627 B2
(45) Date of Patent: Sep. 29, 2026

(54) MULTILAYER CERAMIC CAPACITOR

(71) Applicant: Murata Manufacturing Co., Ltd., Nagaokakyo (JP)

(72) Inventor: Shinobu Chikuma, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 150 days.

(21) Appl. No.: 18/760,091

(22) Filed: Jul. 1, 2024

(65) Prior Publication Data

US 2024/0355546 A1 Oct. 24, 2024

Related U.S. Application Data

(63) Continuation of application No. PCT/JP2023/019394, filed on May 24, 2023.

(30) Foreign Application Priority Data

Aug. 18, 2022 (JP) ................................ 2022-130642

(51) Int. Cl.
*H01G 4/252* (2006.01)
*H01G 2/06* (2006.01)
(Continued)

(52) U.S. Cl.
CPC ............. *H01G 4/252* (2013.01); *H01G 2/065* (2013.01); *H01G 4/1227* (2013.01); *H01G 4/30* (2013.01)

(58) Field of Classification Search
CPC ...... H01G 4/252; H01G 2/065; H01G 4/1227; H01G 4/30; H01G 4/012; H01G 4/12; H01G 4/232; H01G 4/2325; Y02E 60/13
See application file for complete search history.

(56) References Cited

U.S. PATENT DOCUMENTS

| | | | | |
|---|---|---|---|---|
| 9,439,301 B2 * | 9/2016 | Jeon | ..................... | H05K 3/3442 |
| 2004/0240146 A1 * | 12/2004 | Kayatani | ................ | H01G 2/103 361/306.3 |

(Continued)

FOREIGN PATENT DOCUMENTS

| | | |
|---|---|---|
| JP | H02155209 A | 6/1990 |
| JP | 2000182888 A | 6/2000 |

(Continued)

OTHER PUBLICATIONS

International Search Report in PCT/JP2023/019394, mailed Jul. 25, 2023, 3 pages.

(Continued)

*Primary Examiner* — Dion R. Ferguson
(74) *Attorney, Agent, or Firm* — Keating & Bennett, LLP

(57) ABSTRACT

A multilayer ceramic capacitor includes a multilayer body including dielectric layers and internal electrode layers alternately laminated, and external electrodes each on a corresponding one of end surfaces in a length direction perpendicular or substantially perpendicular to a lamination direction of the multilayer body, and each connected to the internal electrode layers. A surface, in a plan view in the length direction, of each of the external electrodes is covered with an insulating layer except for a frame region having a width of about 1 μm or more and about 100 μm or less from an outer peripheral edge of the surface.

18 Claims, 6 Drawing Sheets

(51) Int. Cl.
*H01G 4/12* (2006.01)
*H01G 4/30* (2006.01)

(56) References Cited

U.S. PATENT DOCUMENTS

| | | | | |
|---|---|---|---|---|
| 2013/0057112 | A1* | 3/2013 | Shirakawa | H01G 4/12 336/200 |
| 2014/0116766 | A1* | 5/2014 | Jeon | H05K 3/3442 361/321.2 |
| 2017/0367187 | A1* | 12/2017 | Chae | H01G 4/248 |
| 2019/0279821 | A1* | 9/2019 | Park | H01G 4/30 |
| 2021/0125785 | A1* | 4/2021 | Chikuma | H01G 4/30 |
| 2023/0034387 | A1* | 2/2023 | Okuda | H01G 4/012 |
| 2024/0355546 | A1* | 10/2024 | Chikuma | H01G 4/252 |

FOREIGN PATENT DOCUMENTS

| | | | | |
|---|---|---|---|---|
| JP | 2015053503 | A | 3/2015 | |
| JP | 2016105488 | A | 6/2016 | |
| KR | 20140053562 | A | 5/2014 | |
| KR | 101422926 | B1 * | 7/2014 | H01G 4/30 |
| KR | 101422929 | B1 * | 7/2014 | H01G 4/12 |
| KR | 101548793 | B1 * | 8/2015 | H01G 2/065 |

OTHER PUBLICATIONS

Written Opinion in PCT/JP2023/019394, mailed Jul. 25, 2023, 4 pages.

* cited by examiner

MULTILAYER CERAMIC CAPACITOR

CROSS REFERENCE TO RELATED APPLICATIONS

This application claims the benefit of priority to Japanese Patent Application No. 2022-130642 filed on Aug. 18, 2022 and is a Continuation Application of PCT Application No. PCT/JP2023/019394 filed on May 24, 2023. The entire contents of each application are hereby incorporated herein by reference.

BACKGROUND OF THE INVENTION

1. Field of the Invention

The present invention relates to multilayer ceramic capacitors each able to reduce or prevent generation of vibration noise caused by a piezoelectric phenomenon during mounting.

2. Description of the Related Art

Conventionally, electronic components such as multilayer ceramic capacitors have been widely used in various electronic devices such as mobile terminal devices including mobile phones and personal computers. Multilayer ceramic capacitors each include a rectangular parallelepiped multilayer body in which dielectric layers and internal electrode layers are alternately laminated, and external electrodes provided on opposite ends of the multilayer body (for example, refer to Japanese Unexamined Patent Application, Publication No. 2000-182888).

Since a dielectric ceramic having a perovskite structure, such as barium titanate, is generally used as the dielectric of the dielectric layers, when an AC voltage is applied while a DC voltage is applied, vibration is generated by a piezoelectric phenomenon. Therefore, when the multilayer ceramic capacitor is mounted on the wiring board and an AC voltage in an audible frequency band of, for example, 20 Hz to 20 kHz is applied to the external electrode, the multilayer ceramic capacitor expands and contracts, and vibrates, ambient air vibrates to generate noise, and the wiring board also vibrates resonantly, such that the noise is amplified and becomes harsh.

SUMMARY OF THE INVENTION

Example embodiments of the present invention provide multilayer ceramic capacitors that are each able to reduce or prevent vibration of a dielectric due to a piezoelectric phenomenon occurring when the multilayer ceramic capacitors are mounted on a wiring board and reduce vibration noise.

The inventor of example embodiments of the present invention has discovered that it is possible to reduce or prevent the vibration noise caused by a piezoelectric phenomenon generated when mounting by providing an insulator at a predetermined position of an external electrode of a multilayer ceramic capacitor.

An example embodiment of the present invention provides a multilayer ceramic capacitor that includes a multilayer body including a plurality of dielectric layers and a plurality of internal electrode layers that are alternately laminated, and external electrodes each on a corresponding one of end surfaces in a length direction perpendicular or substantially perpendicular to a lamination direction of the multilayer body, the external electrodes each being connected to the plurality of internal electrode layers. A surface, in a plan view in the length direction, of each of the external electrodes is covered with an insulating layer except for a frame region having a width of about 1 μm or more and about 100 μm or less from an outer peripheral edge of the surface.

According to example embodiments of the present invention, it is possible to provide multilayer ceramic capacitors that are each able to reduce or prevent vibration of a dielectric due to a piezoelectric phenomenon occurring when the multilayer ceramic capacitors are mounted on a wiring board and reduce vibration noise.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
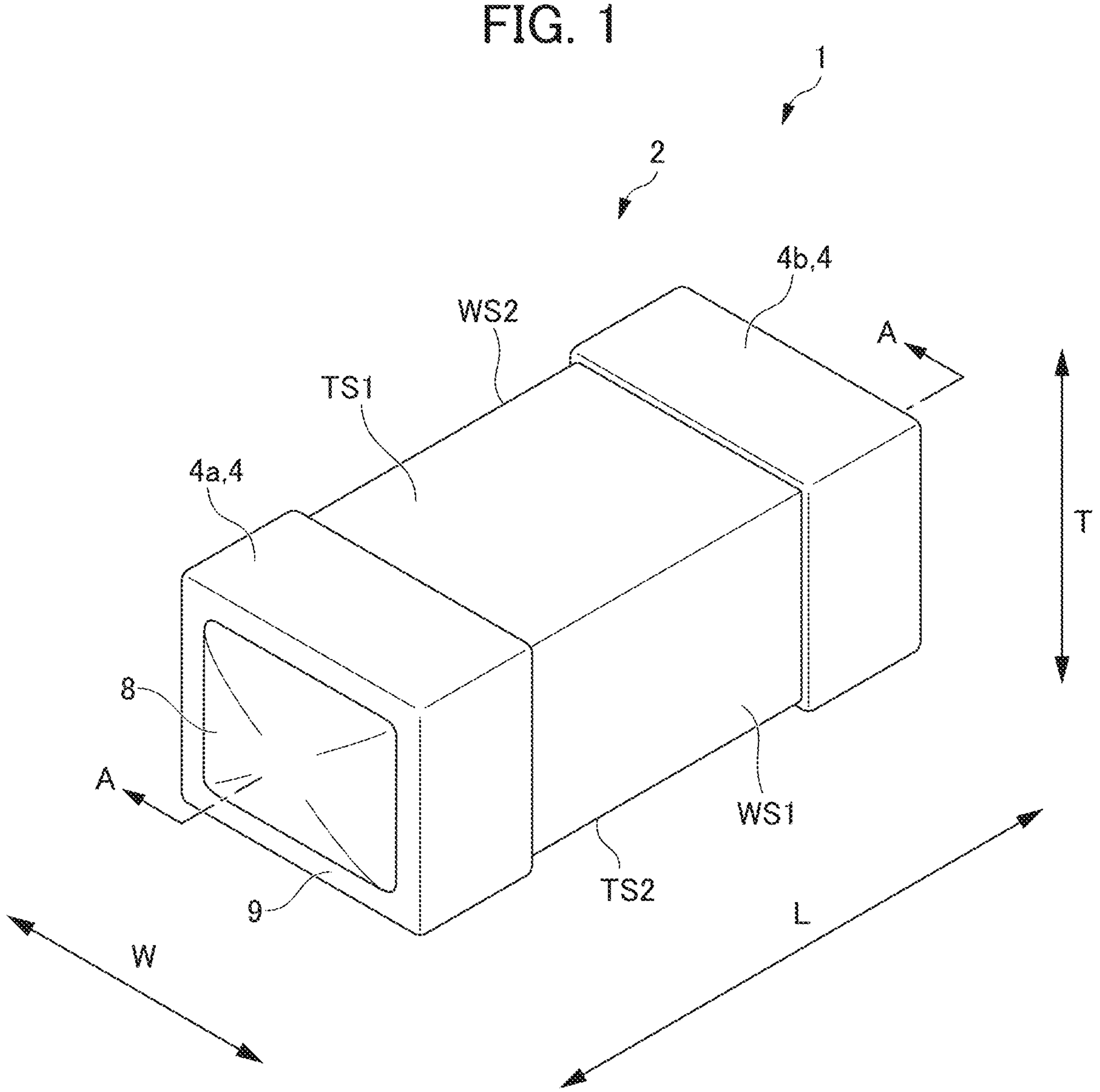
FIG. 1 is an external view of a multilayer ceramic capacitor according to an example embodiment of the present invention.

Hereinafter, multilayer ceramic capacitors according to example embodiments of the present invention will be described. However, the present invention is not limited thereto. In addition, the drawings may be schematically simplified and drawn in order to explain the contents of the present invention, and the drawn components or the ratio of the dimensions between the components may not coincide with the ratio of the dimensions described in the specification. In addition, components described in the specification may be omitted in the drawings or may be drawn with the number of components omitted.

Multilayer Ceramic Capacitor

Figure 2:
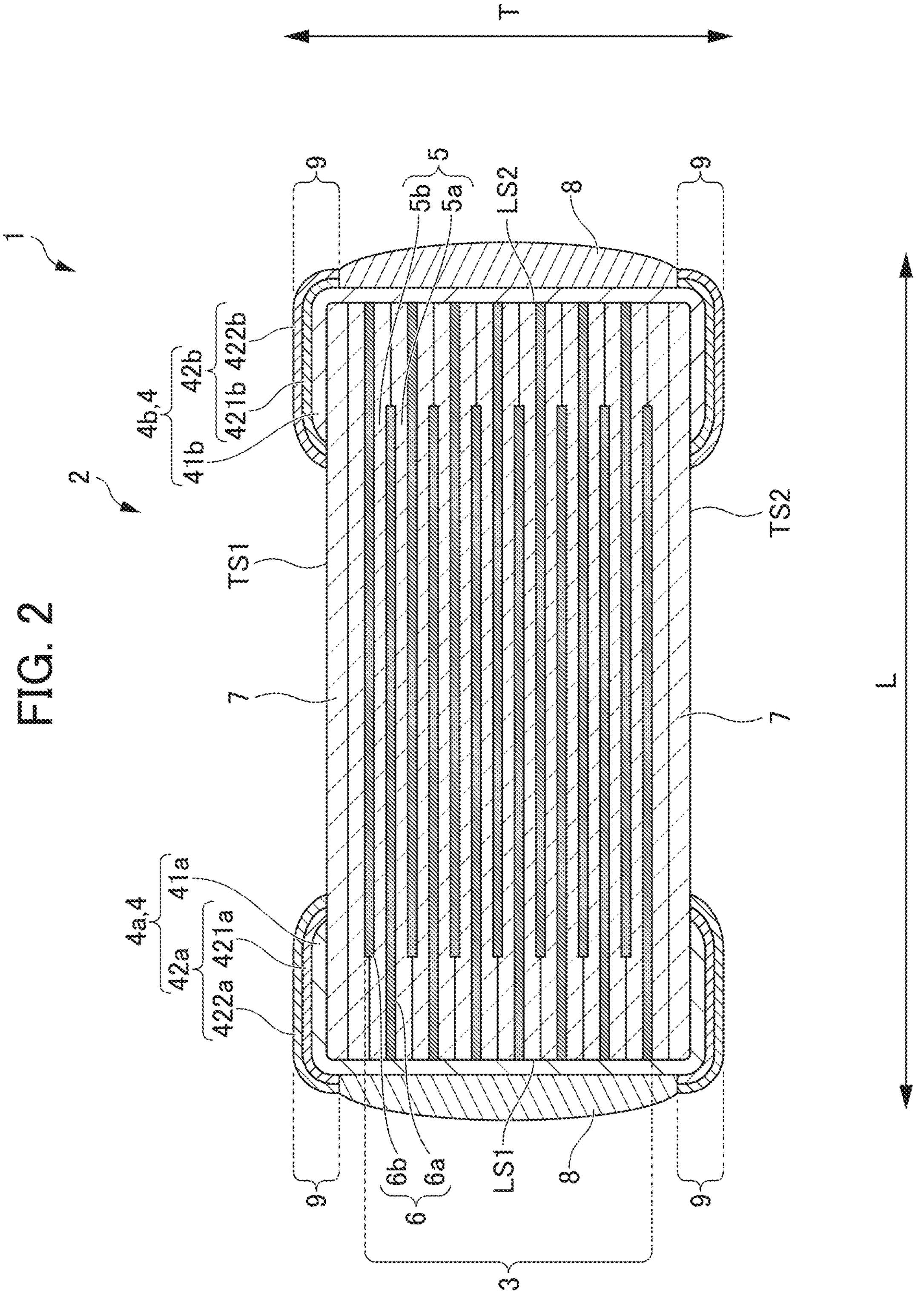
FIG. 2 is a cross-sectional view taken along the line A-A of the multilayer ceramic capacitor shown in FIG. 1.
Figure 3:
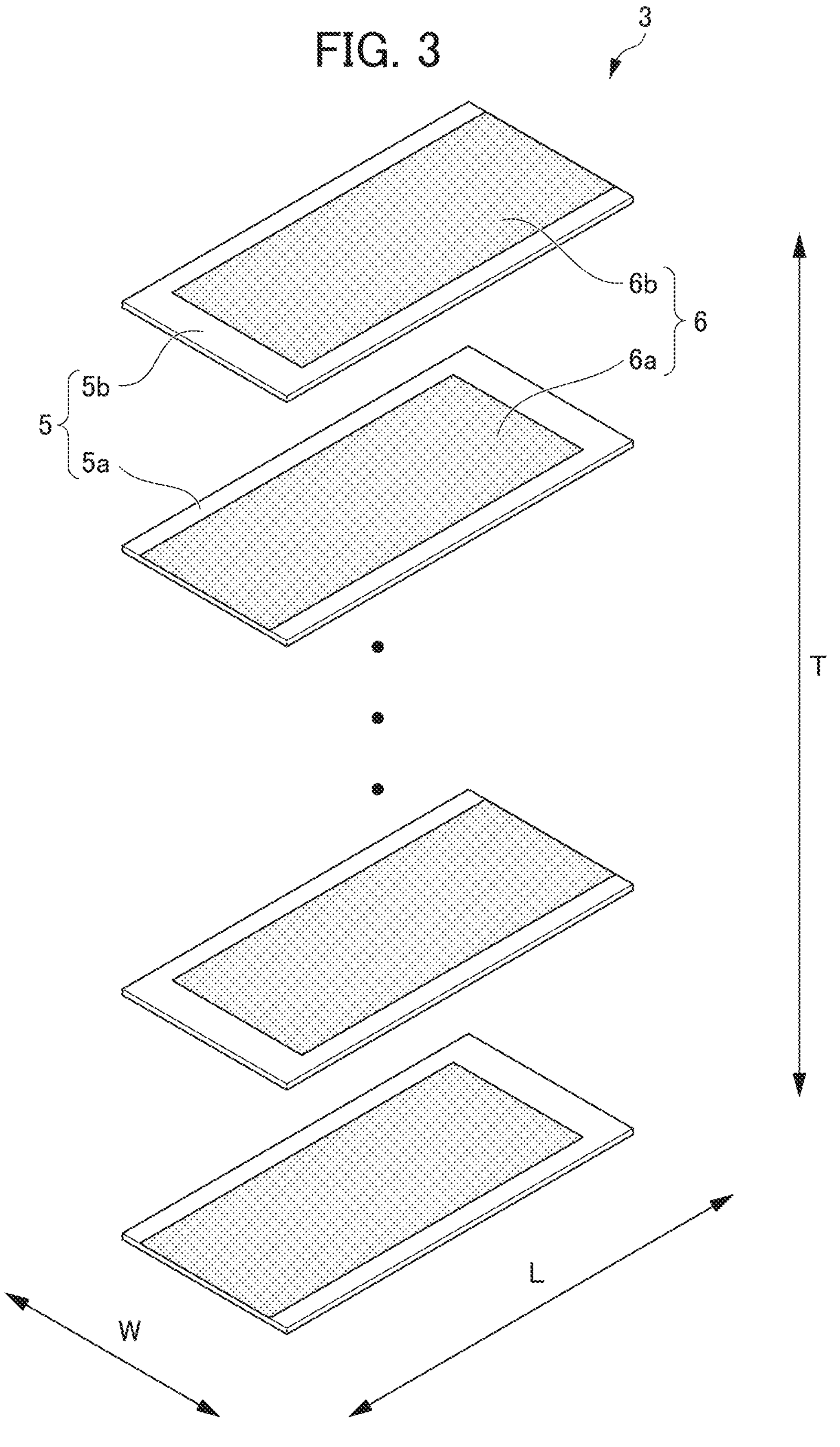
FIG. 3 is an exploded perspective view schematically showing an example of an inner layer portion.

FIGS. 1 to 3 each show the shape and configuration of a multilayer ceramic capacitor 1 according to an example embodiment of the present invention. FIG. 1 is an external view of a multilayer ceramic capacitor 1 according to the present example embodiment. FIG. 2 is a cross-sectional view (an LT cross-sectional view) of the multilayer ceramic capacitor 1 taken along the line A-A in the middle portion in the width direction W shown in FIG. 1. FIG. 3 is a schematic view of a configuration of an inner layer portion 3. In addition, the configuration of the multilayer ceramic capacitor 1 will be described with reference to a lamination (stacking) direction T defined as a direction in which the dielectric layers and the internal electrode layers are laminated, a length direction L defined as a direction perpendicular or substantially perpendicular to the lamination direction T, and a width direction W defined as a direction perpendicular or substantially perpendicular to the lamination direction T and the length direction L. In example embodiments of the present invention, the width direction W, the length direction L, and the lamination direction T are orthogonal or substantially orthogonal to each other, but are not necessarily orthogonal or substantially orthogonal to each other, and may intersect each other.

The multilayer ceramic capacitor 1 includes a multilayer body 2 having a rectangular or substantially rectangular parallelepiped shape. The multilayer body 2 includes an inner layer portion 3. The multilayer body further includes a pair of a first main surface TS1 and a second main surface TS2 opposed to each other in the lamination direction T, a pair of a first end surface LS1 and a second end surface LS2 opposed to each other in the length direction L orthogonal or substantially orthogonal to the lamination direction T, and a pair of a first lateral surface WS1 and a second lateral surface WS2 opposed to each other in the width direction W orthogonal or substantially orthogonal to both the lamination direction T and the length direction L.

Although the dimensions of the multilayer ceramic capacitor 1 are not particularly limited, for example, the dimension in the lamination direction T may be about 0.1 mm to about 2.5 mm, the dimension in the length direction L may be about 0.1 mm to about 3.2 mm, and the dimension in the width direction W may be about 0.1 mm to about 2.5 mm.

The inner layer portion 3 includes a plurality of dielectric layers 5 and a plurality of internal electrode layers 6. The internal electrode layers 6 include first internal electrode layers 6*a* and second internal electrode layers 6*b*. The first internal electrode layers 6*a* and the second internal electrode layers 6*b* are provided on the dielectric layers 5*a* and 5*b*, respectively.

Each of the internal electrode layers 6 extends in the length direction L and has a rectangular or substantially rectangular shape in a plan view in the lamination direction T. Each of the first internal electrode layers 6*a* extends toward and is exposed at the first end surface LS1 of the multilayer body 2, and each of the second internal electrode layers 6*b* extends toward and is exposed at the second end surface LS2 of the multilayer body 2.

Each of the dielectric layers 5 is made of a dielectric material. For the dielectric material, for example, a dielectric ceramic including a component such as $BaTiO_3$, $CaTiO_3$, $SrTiO_3$, or $CaZrO_3$ can be used. Further, the dielectric material may be obtained by adding an auxiliary component such as, for example, a Mn compound, a Fe compound, a Cr compound, a Co compound, or a Ni compound to these main components.

The thickness of the dielectric layer 5 is not particularly limited, but may be, for example, about 0.3 μm to about 2.0 μm in an effective region of capacitance generation provided by the first internal electrode layers 6*a* and the second internal electrode layers 6*b*.

The number of the dielectric layers 5 is not particularly limited, but may be, for example, 1 to 6000 layers in the effective region of capacitance generation provided by the first internal electrode layers 6*a* and the second internal electrode layers 6*b*.

On both upper and lower sides of the inner layer portion 3, outer layer portions 7 are provided which do not include any internal electrode layer 6, but include only the dielectric layers 5. The thickness of each of the outer layer portions 7 is not limited, but may be, for example, about 15 μm to about 150 μm. In addition, the thickness of the dielectric layer in each of the outer layer portions 7 may be larger than the thickness of each of the dielectric layers in the effective region of the capacitance generation in which the internal electrode layers 6 are provided. Further, the material of the dielectric layer in each of the outer layer portions may be different from the material of the dielectric layers in the inner layer portion.

FIG. 3 is an exploded view of the inner layer portion 3 for each dielectric layer 5 in the lamination direction T.

Each of the internal electrode layers 6 is formed by, for example, sintering, on a dielectric layer, an electrically conductive paste including a metal powder defining and functioning as an electrical conductor, an organic solvent, a binder, and a dispersant. The internal electrode layers 6 and the dielectric layers 5 are alternately laminated to define the inner layer portion 3. The internal electrode layers 6 each include a first internal electrode layer 6*a* and a second internal electrode layer 6*b*, and the first internal electrode layer 6*a* and the second internal electrode layer 6*b* are provided on the dielectric layers 5*a* and 5*b*, respectively.

For the internal electrode layers 6, for example, a metal such as Ni, Cu, Ag, Pd, an Ag—Pd alloy, or Au may be used. These metals may be compounds including these metal elements or alloys with other metals.

The thickness of each of the internal electrode layers 6 is not particularly limited, but may be, for example, about 0.3 μm to about 1.5 μm.

A first external electrode 4*a* and a second external electrode 4*b* are respectively provided on the first end surface LS1 and the second end surface LS2 of the multilayer body 2.

The first external electrode 4*a* includes a first base electrode layer 41*a* and a first plated layer 42*a* provided on the first base electrode layer 41*a*.

The second external electrode 4*b* includes a second base electrode layer 41*b* and a second plated layer 42*b* provided on the second base electrode layer 41*b*.

The first base electrode layer 41*a* is provided on the first end surface LS1. The first base electrode layer 41*a* is connected to the first internal electrode layers 6*a*. In the present example embodiment, the first base electrode layer 41*a* extends from the first end surface LS1 to a portion of the first main surface TS1 and a portion of the second main surface TS2, and a portion of the first lateral surface WS1 and a portion of the second lateral surface WS2.

The second base electrode layer 41*b* is provided on the second end surface LS2. The second base electrode layer 41*b* is connected to the second internal electrode layers 6*b*. In the present example embodiment, the second base electrode layer 41*b* extends from the second end surface LS2 to a portion of the first main surface TS1 and a portion of the second main surface TS2, and a portion of the first lateral surface WS1 and a portion of the second lateral surface WS2.

Each of the first base electrode layer 41*a* and the second base electrode layer 41*b* includes, for example, at least one of a fired layer, an electrically conductive resin layer, a thin film layer, and the like. Each of the first base electrode layer 41*a* and the second base electrode layer 41*b* of the present example embodiment is, for example, a fired layer. The fired layer preferably includes a metal component and either a glass component or a ceramic component, or includes a metal component and both a glass component and a ceramic component. The metal component includes, for example, at least one selected from Cu, Ni, Ag, Pd, an Ag—Pd alloy, Au, and the like. The glass component includes, for example, at least one selected from B, Si, Ba, Mg, Al, Li, and the like. For the ceramic component, the same type of ceramic material as the dielectric layer 5 may be used, or a different type of ceramic material may be used. The ceramic component includes, for example, at least one selected from $BaTiO_3$, $CaTiO_3$, (Ba, Ca) $TiO_3$, $SrTiO_3$, $CaZrO_3$, and the like.

The fired layer is formed by, for example, applying an electrically conductive paste including glass and metal to a multilayer body, and firing the resulting product. The fired layer may be a layer obtained by simultaneously firing a multilayer chip having internal electrode layers and dielectric layers, and an electrically conductive paste applied to the multilayer chip, or may be a layer obtained by firing the multilayer chip having internal electrode layers and dielectric layers to obtain a multilayer body, and then applying the electrically conductive paste to the multilayer body, and firing the multilayer body. In addition, when the multilayer chip including g the internal electrode layers and the dielectric layers and the electrically conductive paste applied to the multilayer chip are fired at the same time, the fired layer is preferably formed by firing a material to which a ceramic material is added instead of a glass component. In this case, it is preferable to use the same type of ceramic material as the dielectric layer as the ceramic material to be added. The fired layer may include a plurality of layers.

The thickness in the length direction L of the first base electrode layer 41*a* located on the first end surface LS1 is preferably, for example, about 3 μm or more and about 160 μm or less in the middle portion of the first base electrode layer 41*a* in the lamination direction T and the width direction W.

The thickness in the length direction L of the second base electrode layer 41*b* located on the second end surface LS2 is preferably, for example, about 3 μm or more and about 160 μm or less in the middle portion of the second base electrode layer 41*b* in the lamination direction T and the width direction W.

In a case where the first base electrode layer 41*a* is also provided on a portion of at least one of the first main surface TS1 and the second main surface TS2, the thickness of the first base electrode layer 41*a* provided on this portion in the lamination direction T is preferably, for example, about 3 μm or more and about 40 μm or less in the middle portion of the first base electrode layer 41*a* provided on this portion in the length direction L and the width direction W.

In a case where the first base electrode layer 41*a* is also provided on a portion of at least one of the first lateral surface WS1 and the second lateral surface WS2, the thickness of the first base electrode layer 41*a* provided on this portion in the width direction W is preferably, for example, about 3 μm or more and about 40 μm or less in the middle portion of the first base electrode layer 41*a* provided on this portion in the length direction L and the lamination direction T.

In a case where the second base electrode layer 41*b* is also provided on a portion of at least one of the first main surface TS1 and the second main surface TS2, the thickness of the second base electrode layer 41*b* provided on this portion in the lamination direction T is preferably, for example, about 3 μm or more and about 40 μm or less in the middle portion of the second base electrode layer provided on this portion in the length direction L and the width direction W.

In a case where the second base electrode layer 41*b* is also provided on a portion of at least one of the first lateral surface WS1 and the second lateral surface WS2, the thickness of the second base electrode layer 41*b* provided on this portion in the width direction W is preferably, for example, about 3 μm or more and about 40 μm or less in the middle portion of the second base electrode layer 41*b* provided on this portion in the length direction L and the lamination direction T.

In addition, the first base electrode layer 41*a* and the second base electrode layer 41*b* may not be provided, and a first plated layer 42*a* and a second plated layer 42*b* described later may be directly provided on the multilayer body 2.

In addition, each of the first base electrode layer 41*a* and the second base electrode layer 41*b* is not limited to the fired layer, and each may be, for example, a thin film layer. The thin film layer is formed by a thin film forming method such as, for example, sputtering or vapor deposition. The thin film layer is a layer having a thickness of, for example, about 1 μm or less on which metal particles are deposited.

The first plated layer 42*a* covers the first base electrode layer 41*a*.

The second plated layer 42*b* covers the second base electrode layer 41*b*.

The first plated layer 42*a* and the second plated layer 42*b* may include, for example, at least one of Cu, Ni, Sn, Ag, Pd, an Ag—Pd alloy, Au, and the like. Each of the first plated layer 42*a* and the second plated layer 42*b* may include a plurality of layers.

Each of the first plated layer 42*a* and the second plated layer 42*b* preferably includes, for example, a two-layer configuration in which Sn plated layers 422*a* and 422*b* are provided on Ni plated layers 421*a* and 421*b*, respectively. In this case, the Ni plated layers 421*a* and 421*b* prevent the first base electrode layer 41*a* and the second base electrode layer 41*b* from being eroded by solder when the multilayer ceramic capacitor 1 is mounted. The Sn plated layer improves solder wettability when the multilayer ceramic capacitor 1 is mounted. This facilitates mounting of the multilayer ceramic capacitor 1. When each of the first plated layer 42*a* and the second plated layer 42*b* includes such a two-layer configuration of a Ni plated layer and a Sn plated layer, the thickness of each of the Ni plated layer and the Sn plated layer is, for example, preferably about 2 μm or more and about 15 μm or less.

Each of the surfaces of the first external electrode 4*a* and the second external electrode 4*b* in a plan view in the length direction L is covered with an insulating layer 8, except for a frame region 9 having a width of, for example, about 1 μm or more and about 100 μm or less from the outer peripheral edge of the surface.

When each of the external electrodes includes the base electrode layer and the plated layer, the insulating layer can be provided in a predetermined range of the surface of the plated layer. However, when the insulating layer is provided in a predetermined range of the surface of the base electrode layer, the plated layer is provided on the surface of the base electrode layer, except for the range in which the insulating layer is provided.

In addition, in a case where the plated layer includes a plurality of layers, the insulating layer can be provided in a predetermined range of the surface of the plated layer functioning as an outermost layer. However, in a case where the insulating layer is provided on the surface of any of the plated layers other than the outermost layer, a plated layer provided on the plated layer on which the insulating layer is provided includes a plated layer laminated at a portion excluding the range in which the insulating layer is provided, such that the insulating layer is provided on the surface of the external electrode that can come into contact with a solder fillet.

In the example embodiment shown in FIG. 2, the insulating layer 8 is provided on each of the surfaces, in a plan view in the length direction L, of the first base electrode layer 41*a* and the second base electrode layer 41*b* of the first external electrode 4*a* and the second external electrode 4*b*, in a range in which the frame region 9 having a width of, for example, about 1 μm or more and about 100 μm or less is excluded from the outer peripheral edge of each of the surfaces, and further, the Ni plated layers 421*a* and 421*b* and the Sn plated layers 422*a* and 422*b* are respectively provided on the surfaces of the first base electrode layer 41*a* and the second base electrode layer 41*b*, excluding the range in which the insulating layer 8 is provided.

The multilayer ceramic capacitor 1 is connected to lands 51*a* and 51*b*, for example, by applying solder to the surfaces of the first external electrode 4*a* and the second external electrode 4*b* below the insulating layer 8. By providing the frame region 9, since the solder fillet can be formed in a range of a certain height from below the outer peripheral edge, it is possible to reliably perform bonding to the wiring board.

The material of the insulating layer 8 is not particularly limited as long as it has insulating properties, but it is preferable to use, for example, a synthetic resin because the insulating layer can be easily formed on the surface of the external electrode. As the synthetic resin, for example, a thermosetting resin such as an epoxy resin, a polyimide resin, and a phenol resin, and a thermoplastic resin such as a polyethylene resin and a polyamide resin can be used.

By providing the insulating layer 8 on each of the surfaces of the first external electrode 4*a* and the second external electrode 4*b* corresponding to the region in which the internal electrode layers 6 are laminated when viewed in a plan view in the length direction L, it is possible to prevent the solder fillets 52*a* and 52*b* from spreading up to the height at which the internal electrode layers 6 are provided at the time of mounting. With such a configuration, it is possible to effectively reduce or prevent the generation of vibration noise caused by the piezoelectric phenomenon.

The thickness of the insulating layer 8 in the length direction L is, for example, about 200 μm or less, and the insulating layer 8 includes the thickest portion in the middle as viewed in the length direction L. With such a configuration, it is possible to prevent the multilayer ceramic capacitor from increasing in size, and it is possible to reliably prevent the solder fillet from spreading since the middle portion of the surface of the insulating layer protrudes outward from the bottom portion when mounted on the wiring board.

Figure 5:
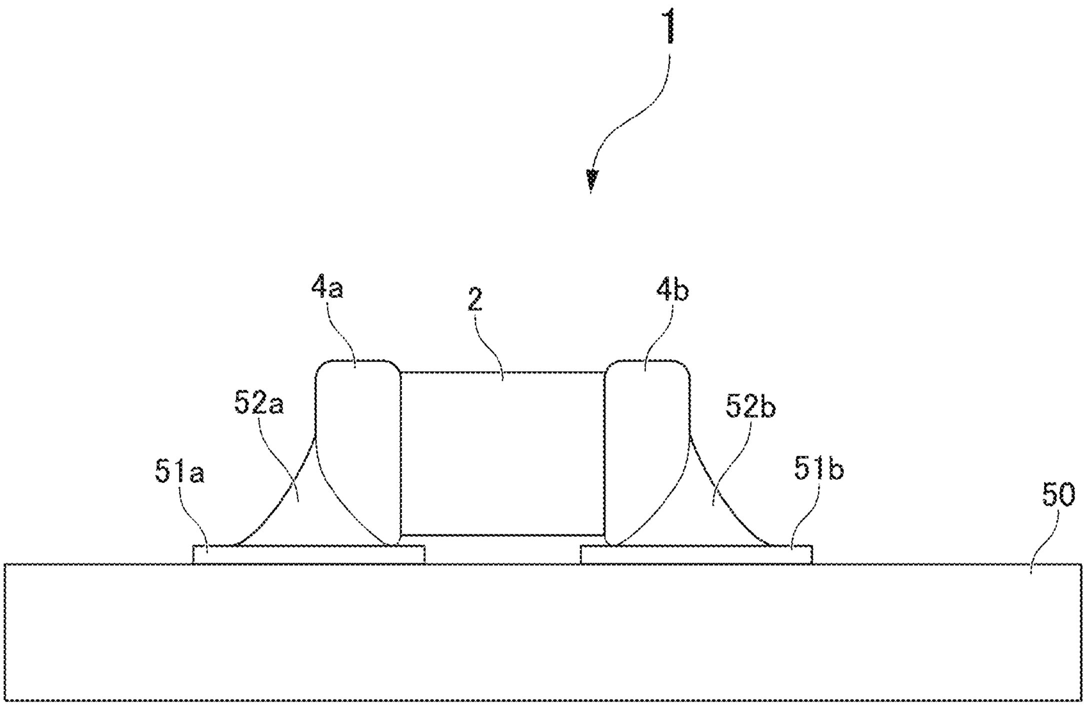
FIG. 5 is an external view of an example of a mounting state of a conventional multilayer ceramic capacitor.

The multilayer ceramic capacitor 1 is mounted by applying solder to the surfaces of the first external electrode 4*a* and the second external electrode 4*b* and connecting them to the lands 51*a* and 51*b*. However, in the conventional multilayer ceramic capacitor 1, as shown in FIG. 5, when the height at which the solder fillets 52*a* and 52*b* provided at the time of mounting spread is high and reaches the height at which the internal electrode layers 6 are provided, the piezoelectric phenomenon of the dielectric occurs, and the expansion and contraction vibration of the multilayer ceramic capacitor 1 easily occurs.

Figure 4:
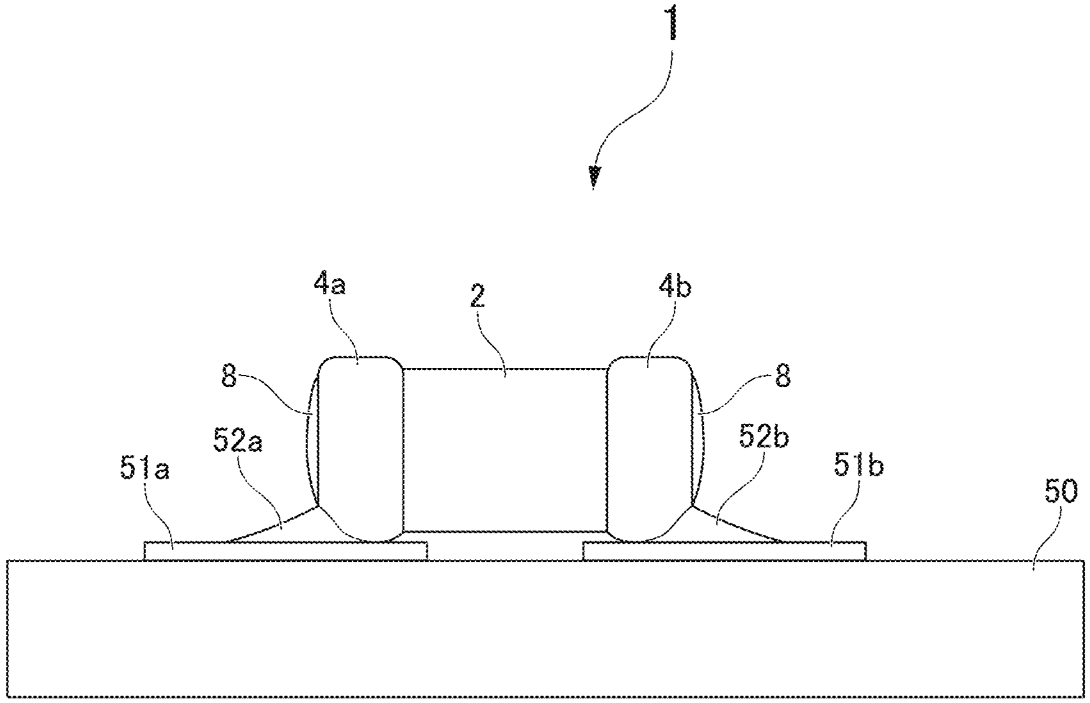
FIG. 4 is an external view of an example of a mounted state of a multilayer ceramic capacitor according to an example embodiment of the present invention.

FIG. 4 shows a mounting example of the multilayer ceramic capacitor 1 according to the present example embodiment. In the multilayer ceramic capacitor 1, since the insulating layer 8 is provided in a predetermined range of each of the surfaces of the first external electrode 4*a* and the second external electrode 4*b*, the height of the solder fillets 52*a* and 52*b* spreading is reduced to be low, and thus it is possible to reduce or prevent the generation of vibration noise caused by a piezoelectric phenomenon.

Validation Test

The multilayer ceramic capacitor according to the present example embodiment of the present invention was subjected to a test to confirm the advantageous effect of reducing or preventing the vibration noise.

In the validation test, sound pressures (dB) of vibration noises generated when a DC voltage of about 3 V and an AC voltage of about 1 V were applied were measured for an Example in which a multilayer ceramic capacitor in which an insulating layer was provided in a predetermined range on each of the surfaces of the external electrodes of the present invention was used as a sample and a Comparative Example in which a conventional multilayer ceramic capacitor in which an insulating layer was not provided was used as a sample.

Figure 6:
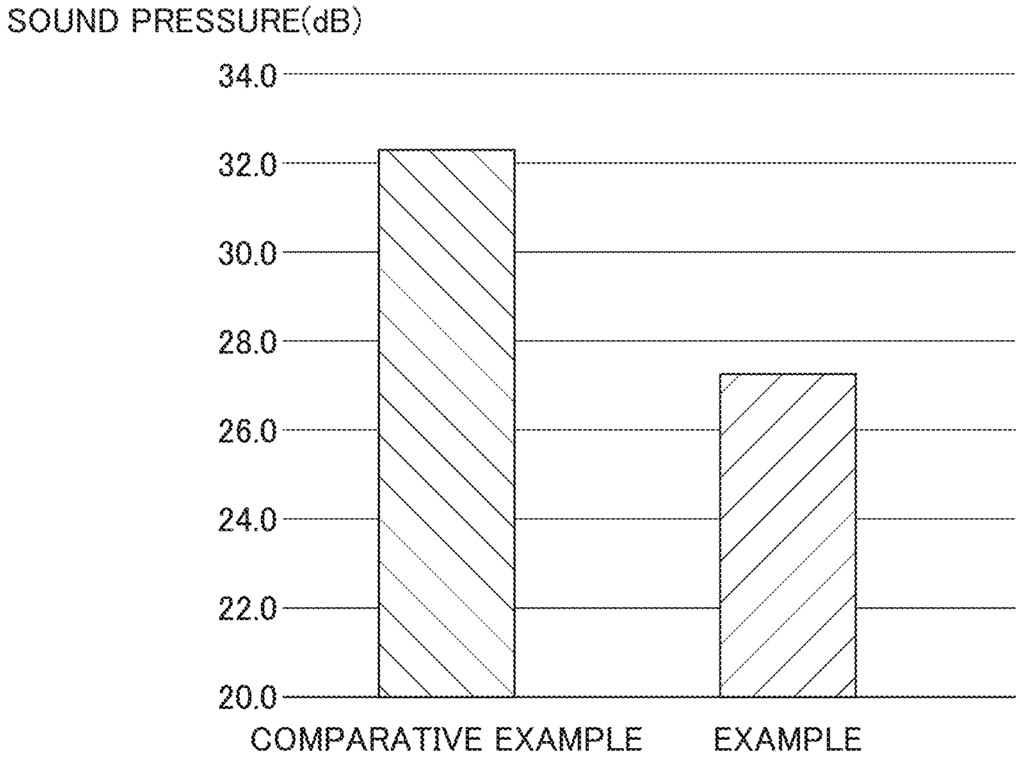
FIG. 6 is a graph showing an advantageous effect of reducing vibration noise of a multilayer ceramic capacitor according to an example embodiment of the present invention.

As shown in FIG. 6, in the multilayer ceramic capacitor (Example) of the present invention, it was confirmed that the vibration of the dielectric caused by the piezoelectric phenomenon occurring when the multilayer ceramic capacitor was mounted on the wiring board was reduced and the vibration noise was reduced.

Although example embodiments of the present invention have been described above, the present invention is not limited to the example embodiments, and can be configured in various modes without departing from the scope of the present invention. For example, although an example in which the insulating layer 8 is provided on both of the first external electrode 4*a* and the second external electrode 4*b* has been described in the example embodiments above, the same or substantially the same advantageous effect can be obtained also when the insulating layer 8 is provided on either the first external electrode 4*a* or the second external electrode 4*b*.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers and a plurality of internal electrode layers laminated; and external electrodes each on a corresponding one of end surfaces in a length direction perpendicular or substantially perpendicular to a lamination direction of the multilayer body, the external electrodes each being connected to at least one of the plurality of internal electrode layers; wherein a surface, as viewed in the length direction, of at least one of the external electrodes is covered with an insulating layer except for a frame region having a width of about 1 μm or more and about 100 μm or less from an outer peripheral edge of the surface; and the insulating layer has a thickness of about 200 μm or less in the length direction, and includes a thickest portion in a central region as viewed in the length direction.

2. The multilayer ceramic capacitor according to claim 1, wherein a surface, in a plan view in the length direction, of each of the external electrodes corresponding to a region in which the internal electrode layers are laminated is covered with the insulating layer.

3. The multilayer ceramic capacitor according to claim 1, wherein the multilayer ceramic capacitor has a dimension in the lamination direction of about 0.1 mm to about 2.5 mm, a dimension in the length direction of about 0.1 mm to about 3.2 mm, and a dimension in the width direction of about 0.1 mm to about 2.5 mm.

4. The multilayer ceramic capacitor according to claim 1, wherein the multilayer body includes an inner layer portion and outer layer portions on both sides of the inner layer portion in the lamination direction;

the inner layer portion includes dielectric layers of the plurality of dielectric layers and the plurality of internal electrode layers; and each of the outer layer portions includes dielectric layers of the plurality of dielectric layers, but does not include any of the plurality of internal electrode layers.

5. The multilayer ceramic capacitor according to claim 1, wherein each of the plurality of dielectric layers includes $BaTiO_3$, $CaTiO_3$, $SrTiO_3$, or $CaZrO_3$ as a main component.

6. The multilayer ceramic capacitor according to claim 5, wherein each of the plurality of dielectric layers includes a Mn compound, a Fe compound, a Cr compound, a Co compound, or a Ni compound as an auxiliary component.

7. The multilayer ceramic capacitor according to claim 4, wherein a thickness of each of the plurality of dielectric layers in the inner layer portion is about 0.3 μm to about 2.0 μm.

8. The multilayer ceramic capacitor according to claim 4, wherein each of the outer layer portions has a thickness of about 15 μm to about 150 μm.

9. The multilayer ceramic capacitor according to claim 1, wherein each of the inner electrode layers includes Ni, Cu, Ag, Pd, an Ag—Pd alloy, or Au.

10. A mounting structure of a multilayer ceramic capacitor, the mounting structure comprising:

a multilayer ceramic capacitor according to claim 1;

a land on a wiring board; and a solder connecting the land and a corresponding one of the external electrodes of the multilayer ceramic capacitor to each other.

11. The mounting structure according to claim 10, wherein a surface, in a plan view in the length direction, of each of the external electrodes corresponding to a region in which the internal electrode layers are laminated is covered with the insulating layer.

12. The mounting structure according to claim 10, wherein the multilayer ceramic capacitor has a dimension in the lamination direction of about 0.1 mm to about 2.5 mm, a dimension in the length direction of about 0.1 mm to about 3.2 mm, and a dimension in the width direction of about 0.1 mm to about 2.5 mm.

13. The mounting structure according to claim 10, wherein the multilayer body includes an inner layer portion and outer layer portions on both sides of the inner layer portion in the lamination direction;

the inner layer portion includes dielectric layers of the plurality of dielectric layers and the plurality of internal electrode layers; and each of the outer layer portions includes dielectric layers of the plurality of dielectric layers, but does not include any of the plurality of internal electrode layers.

14. The mounting structure according to claim 10, wherein each of the plurality of dielectric layers includes $BaTiO_3$, $CaTiO_3$, $SrTiO_3$, or $CaZrO_3$ as a main component.

15. The mounting structure according to claim 14, wherein each of the plurality of dielectric layers includes a Mn compound, a Fe compound, a Cr compound, a Co compound, or a Ni compound as an auxiliary component.

16. The mounting structure according to claim 13, wherein a thickness of each of the plurality of dielectric layers in the inner layer portion is about 0.3 μm to about 2.0 μm.

17. The mounting structure according to claim 13, wherein each of the outer layer portions has a thickness of about 15 μm to about 150 μm.

18. The mounting structure according to claim 10, wherein each of the plurality of inner electrode layers includes Ni, Cu, Ag, Pd, an Ag—Pd alloy, or Au.

* * * * *